Dec. 28, 1965 J. V. SHARP 3,226,690

DATA TRANSLATOR

Filed Nov. 3, 1961 2 Sheets-Sheet 1

INVENTOR
JOHN V. SHARP

BY Seghers, Rothwell, Mion & Zinn
ATTORNEYS

Dec. 28, 1965 J. V. SHARP 3,226,690

DATA TRANSLATOR

Filed Nov. 3, 1961 2 Sheets-Sheet 2

United States Patent Office 3,226,690

Patented Dec. 28, 1965

3,226,690

DATA TRANSLATOR

John V. Sharp, Poughkeepsie, N.Y., assignor to International Business Machines Corporation, New York, N.Y., a corporation of New York Filed Nov. 3, 1961, Ser. No. 150,016
16 Claims. (Cl. 340—172.5)

This invention relates to apparatus for translating data from a low speed multi-column punched record to a high speed erasable form, such as magnetic tape, and more particularly to a high speed multi-column photoelectric sensing arrangement for reading out the individual columns of the punched record, whereby the parallel bit data may operate a printer and may be recorded in the same form on magnetic tape with read out means being subsequently employed for serializing the original parallel bit pattern of each card column.

The invention is specifically directed to a translation system of this type wherein input data from both a manually operated keyboard and a punched record may control the operation of a printer (such as a typewriter) and be simultaneously recorded on a magnetic tape for subsequent serialization of the original parallel bit pattern for single channel transmission to another utilization device.

The magnetic tape, therefore, acts as a temporary buffer for receiving information from the keyboard and the punched record and in which read out of the magnetic tape occurs during the normal carriage return operation of the typewriter keyboard.

One problem encountered in utilizing a record card or tape in which the information is stored by means of punch holes or the like is the difficulty in high speed retrieval and translation of this data for use in data processing. Since data is commonly recorded in parallel bit form on a tape or card, it is sometimes desirable to translate the data into serial form. However, the known serializing translators have been relatively complicated and have not given the translating speeds desired. Photoelectric means have long been employed in sensing devices for reading out the information carried by the punch cards or tapes, with the photoelectric means generally taking the form of a plurality of photosensitive elements positioned on one side of the moving punched record in row form extending transversely to the direction of movement of the record with a light source positioned opposite the punched record for delivering a segregated light ray to an associated photosensitive element to effect a signal indicative of the presence of the punched hole. In such arrangements, it is common to continuously move the punched record past the sensing means whereby the sensing speed is limited by the velocity of the card moving through the sensing station.

It is, therefore, a primary object of this invention to provide an improved apparatus including a photoelectric sensing device for translating data from a multi-column punched record sensing device including photoelectric means into another record readable at high speed and in which the photoelectric sensing speed is independent of the subsequent reading speed from the high speed record.

It is a further object of this invention to provide an improved apparatus for transferring data from a multi-column punched record to another record form by photoelectric means in which the punched record remains stationary during the photoelectric sensing operation.

It is another object of this invention to provide an improved photoelectric sensing apparatus for reading a multi-column punched record in which a single row of photosensitive means may be operatively associated in a sequential manner with a plurality of parallel columns of information of said punched record while said record is stationarily positioned within the sensing apparatus.

It is an additional object of this invention to provide an apparatus for translating data from a multi-column punched record to a magnetic tape in which the magnetic tape forms part of the photoelectric sensing apparatus.

It is a further object of this invention to provide an improved apparatus for translating parallel bit data from a multi-column punched record to a magnetic tape in which the data carried by the magnetic tape may be serialized during read out to achieve a by bit data signal.

It is another object of this invention to provide an improved apparatus for transferring data from a multi-column punched record to another record form capable of being read at high speed and in which additional information may be recorded by use of conventional typewriter keyboard input means.

It is a further object of this invention to provide an apparatus of this type in which record means for recording in response to the photoelectric sensing apparatus associated with the punched record is controlled by movement of a typewriter carriage.

Other objects of this invention will be pointed out in the following detailed description and claims and illustrated in the accompanying drawings, which disclose, by way of example, the principles of this invention and the best mode which has been contemplated of applying these principles.

In general, the apparatus of this invention includes means for positioning a tape or card carrying spaced, aligned rows and columns of punched information between a light source and a plurality of rows of light pipes which segregate the rays of light passing through the punched holes and directs the rays toward a single common row of photocells. A moving magnetic tape is positioned in the path of the segregated rays between the punched record and the photocells, with the magnetic tape including a single transverse row of spaced apertures acting as a shutter to sequentially align one of the punched rows of the punched record with the photocells. A series of recording heads are positioned adjacent the magnetic tape to record in columnar fashion the information appearing on the punched record. A row of staggered reading heads or the same recording heads shifted, are positioned in the path of the moving magnetic tape for subsequently reading each of the recorded columns in sequential fashion at high speed to generate a related serial by bit data signal.

In one specific form of this invention, there is provided a conventional typewriter including a keyboard and moving carriage in which additional information may be simultaneously recorded on the moving magnetic tape through the same row or separate recording heads during movement of the magnetic tape as the tape acts to transfer the information from the punched record to the magnetic tape. Simultaneously, printing means associated with the system may receive control signals from both the typewriter keyboard and the punched record. Subsequent, high speed serial read out of magnetically recorded information from both the punched record and the typewriter keyboard occurs during carriage return movement of the typewriter carriage which also acts to to return the moving magnetic tape to an initial start position.

Figure 1:
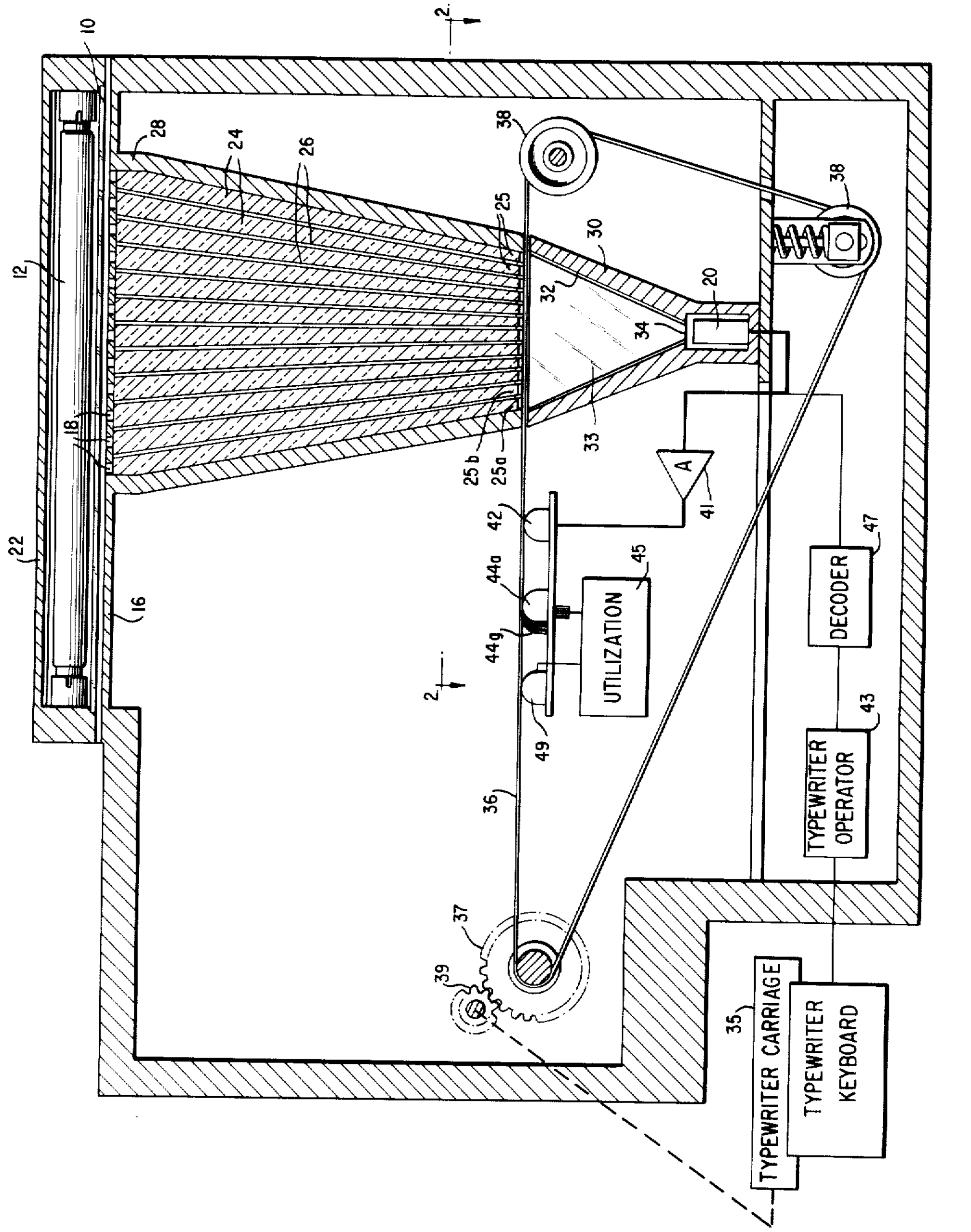
FIGURE 1 is an elevational, cross-sectional view of the apparatus making up one form of the invention.
Figure 2:
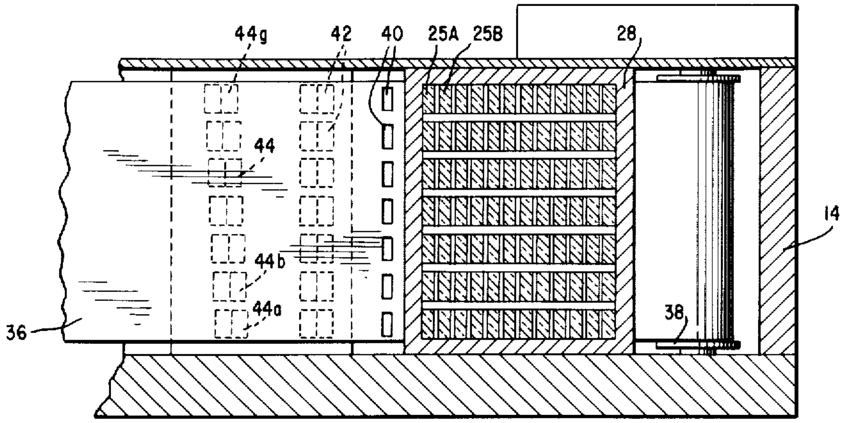
FIGURE 2 is a sectional view taken along lines 2—2 of FIGURE 1.
Figure 3:
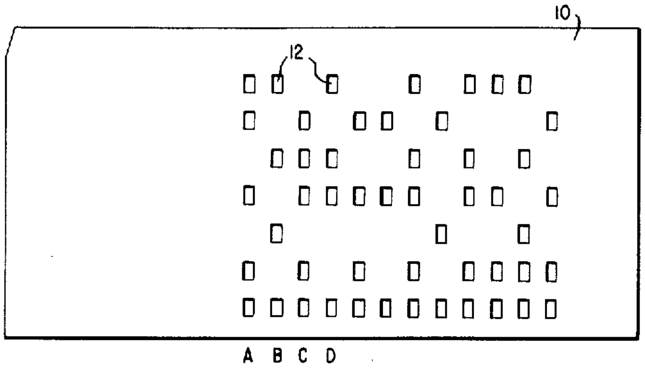
FIGURE 3 is a plan view of one form of the punched record which is sensed by the apparatus of the present invention.

Referring to the drawings, there is shown in FIGURE 3, a punched record 10 which may be of the conventional business machine card type for use with the apparatus shown in FIGURES 1 and 2. The punched record includes a number of punched holes 12 in a number of columns such as A, B, C, D, etc. Each column contains the holes 12 in selected positions and the punching of each column represents an appropriate code in parallel form as is well known in the art.

FIGURE 1 shows generally the apparatus for sensing and translating the data of punched record 10. This apparatus includes a housing member 14 which may be constructed of any desired material and contains a horizontal supporting surface 16 in the upper portion thereof for supporting the punched record 10. A matrix of openings 18 is formed within the supporting surface 16. In the illustrated embodiment, there are provided twelve columns of seven openings 18 for a total of eighty-four openings corresponding to all the possible punch positions which are to be sensed on the punched record 10.

A single row of photoelectric sensing means, such as photocells 20 are located in the lower portion of the housing 14. A suitable light source such as fluorescent lamp 12 is positioned above the card 10 and reflecting member 22 is provided to direct the light downwardly through the matrix of openings 18 formed in the supporting surface.

Means are provided for segregating the light rays passing through the punched holes 12 in record 10, and the openings 18. Such light segregating means includes a matrix of Lucite light conducting pipes or rods 24 corresponding to each opening 18 in each possible punch position in the portion of the record to be sensed. Opaque barriers 26 surround the light pipes 24 to insure that the light passes longitudinally through the pipe, and is prevented from scattering therefrom. The light pipes 24 taper inwardly. Suitable support means 28 are provided for supporting the light rods in the position desired and for preventing the ambient light from entering the upper ends of the lucite rods 24. The lower ends 25 of the rods 24 terminate some distance above the single row of photocells 20. The photocells 20 are mounted within housing member 30 of appropriate construction having a V-shaped central opening and may have inner reflective surfaces 32 for directing the light downwardly through throat portion 34 of the openings to direct the light on each of the individual photocells 20 positioned in a row corresponding to a column of card 10. Housing 30 includes a plurality of separate dividers 33 which act as individual funnels of relatively narrow width for directing segregated light rays from the light piping 24 to the photocells 20.

The present invention includes an arrangement whereby a plurality of columns of information in the punched record may be serially scanned, column by column, using movable light shutter means while the punched record remains stationary. This is accomplished by a flexible magnetizable tape member 36 which is positioned intermediate the Y-shaped housing 30 holding photocells 20 and the lower ends 25 of light conducting rods 24.

The tape 36 is of sufficient width to extend completely across the matrix of light pipes 24. Suitable intermittent drive means are provided for stepping the tape 36. Such drive means may include driven gear 37 and drive pinion 39 connected to a carriage 35 of an associated typewriter, or alternatively an intermittent stepping motor under control of the typewriter carriage may be provided for moving the tape 36. In this manner, the tape 36 is moved, for instance, in a clockwise direction (from left to right between light rod ends 25 and photocells 20 as viewed in FIGURE 1) as the typewriter carriage moves from left to right during a typing operation. During typewriter carriage return the tape 36 rapidly returns.

Support means such as pulleys 38 are provided for supporting the tape for longitudinal movement between the photocells 20 and the light piping 24. The tape 36 is opaque but includes a single row of spaced openings 40 which extend across the tape at right angles to the direction of movement and are of a size corresponding to the size of a terminal portion 25 of a light rod 24. It is, therefore, readily apparent that longitudinal stepping movement of the tape from left to right as indicated in FIGURES 1 and 2 will cause the openings 38 within the tape to be aligned sequentially with the terminal portions 25 of any one column of light pipe members 24 with the stepping tape 36 and openings 40 therein acting as a shutter for directing the light rays from the fluorescent lamps 32 through the punched record openings, column by column, and the light pipes 24 onto the individual photocells 20 depending upon the presence or absence of punched openings 12 in the particular column punched record corresponding to the position of the openings 40 of tape 36. The step by step movement of tape 36 during the light shuttering operation occurs with the length of each step being equal to the width of the ends 25 of light pipes 24.

Since the Y-shaped housing 30 includes an opening adjacent the tape member which extends throughout the area occupied by a single longitudinal row of twelve light pipes 24, the stepping movement of the tape 36 from left to right would expose the photocells 20 sequentially to each of the columns of punched holes 12 in the punched record 10. The row of photocells 20 is coupled to a conventional electrical output system, such that the row of photocells 20 will provide simultaneous electric pulses indicative of information present in the punch code in each successive record column.

The parallel columnar information which photocells 20 sense is amplified and recorded on the magnetic tape 36 by means of conventional electrical circuitry such as amplifiers 41 and recording heads 42. This information is recorded magnetically on the tape in the same form as scanned from the punch card 10. The information may simultaneously be decoded in decoder 47 for controlling a typewriter operator 43. Thus, the information printed by the typewriter keys may be a combination of the manually operated keyboard input means and the data transduced from the punched record.

The row of magnetic recording heads 42 or transducers corresponding to the row of photocells 20 are positioned in a single column extending across the tape in spaced relation. Thus far described, the invention provides means for translating the columnar data from a multi-column punched record to a multi-column magnetic tape. Additional, staggered, magnetic transducer heads are positioned adjacent the row of heads 42 for reading the magnetic tape for subsequent transmission and use in high speed data processing, printing or the like as exemplified by utilization device 45. The read heads 44 are not parallel to the aligned row of write heads 42 but are positioned in staggered form as best shown in FIGURE 2. Head **44*a* is behind the preceding head 44*b* in the row by a predetermined amount to allow each bit in a column to be serially read out. The total amount of stagger from heads 44*a* to 44*g* is less than the distance between the recorded columns of information on tape 36. The spacing of the serially sensed and transmitted bits is determined by the physical staggered position of heads 44 and the return speed of the record 36. With this arrangement, the magnetic information in columnar form is read off in serial fashion so that each code column previously recorded is transposed from parallel form to a related serial by bit data signal for transmission over a single channel. Suitable erase heads 49** may be provided for removing the information from the tape after transmission to the single channel.

In the operation of the high speed translation apparatus, the punched record 10 is moved into a sense position such that the columns of information of the card are aligned with corresponding columns in the matrix of openings 18 on the horizontal support surface 16. Light from the fluorescent lamps 22 passes through the holes 12 in the card 10 and is transmitted through the individual light pipes 24 to the terminal portions adjacent tape 36. Assuming that at this time, the magnetic tape 36 is positioned so that the rows 40 are aligned with the most leftward column of light piping 24, that is the openings 40 in the tape are adjacent the column of light pipe terminal portions 25*a*, the light passing through any of the light pipes 24 will be directed to a corresponding photocell 20 and by means of conventional electrical amplifying and recording networks, will cause the informtion to be magnetically recorded in columnar form on the surface of the magnetic tape lying adjacent the write heads 42 and may simultaneously control typewriter operator 43. The tape is then stepped in synchronism with the escapement mechanism of the typewriter carriage sequentially to the next position where the row of apertures are positioned beneath the column terminal ends 25*b* of the light pipes 24, effecting magnetic recording of a second coded column which is spaced from the first column a distance determined by the space between the terminal portions 25*a* and 25*b* of the light pipes, and causing operation of a second typewriter key. The tape is then advanced in succeeding steps, completely across the column of light pipes 24 to effect a like number of spaced columns of magnetic recordings on the tape 36.

It is often desirable to supplement the information sensed from the punched record 10 by additional manually entered data. Such added data may be recorded on the tape 36 by use of well-known switch circuits operated by the keys of the typewriter and controlling the drive of amplifiers 41. Thus, data typed on the typewriter keys may be additionally recorded on tape 36 for later high speed transmission to a utilizing machine.

After all of the columns of information on the record 10 are scanned optically and magnetically recorded, the carriage return of the typewriter is activated whereby tape 36 is returned rapidly to a position in which the apertures 40 are below the most leftward transverse row of light pipes 25*a* in preparation for another sensing operation. Simultaneously with the rapid movement of the tape from right to left, after completing a sensing operation, the punched record 10 if a tape or long card may be moved to a new position allowing twelve new columns to be positioned adjacent the matrix openings 18 within the support member.

During the high speed movement of the magnetic tape member 36 from right to left, the magnetically recorded data of the columns previously sensed and recorded is read out from the tape by staggered magnetic read heads 44 and applied in serial fashion to a utilization device 45. Since the magnetic read heads 44 are displaced from each other in staggered form, each of the coded columns previously recorded is transposed from a parallel bit to serial by bit signals for transmission over a single line. Because the translating time is not dependent upon the speed of the optical scanning of the punched card or tape, extremely high speed may be achieved by increasing the speed of the moving tape during the magnetic read out in which the tape moves from the extreme right position to the left as a result of typewriter carriage return.

The actual position of the apertures 40 in the magnetic tape, the position of the magnetic write heads 42 and the magnetic read heads 44, may vary to provide desired results and the positioning of the elements as shown is merely indicative of one form that this portion of the apparatus may take. While the present apparatus as shown is adapted for use with a card carrying twelve columns of perforations with seven perforations in each parallel column, it is readily apparent that various modifications may be made for use with various size cards or perforated tapes. For instance, the number of columns may be made complementary with the number of carriage escapement positions for the typewriter carriage. At the same time, while the present invention advantageously makes use of a single tape having magnetic recording characteristics to act both as a recording medium and as a movable shutter, these features may take the form of separate elements which may be simultaneously operated if so desired.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for translating data from a stationary multi-column punched record to high speed output comprising; means for simultaneously passing light through a plurality of said punched record columns, means for segregating the light rays passing through each record perforation, a moving tape positioned in the path of said rays, the tape including a single row of spaced apertures to sequentially allow passage of segregated rays of any one of said record columns, a fixed row of photo-responsive means positioned on the side of said tape opposite said record and aligned with said tape apertures to receive said segregated rays passing therethrough and means associated with said photo-responsive means responsive to ray interception for recording said columnar record information in another form.

2. Apparatus as claimed in claim 1, further including a typewriter having a keyboard and a moving carriage, means coupling carriage movement and tape movement and means associated with said photocells for operating said typewriter irrespective of keyboard operation, said operation of said keyborad as a result of photocell energization being responsive to movement of said typewriter carriage.

3. Apparatus as claimed in claim 1 wherein said tape is of the magnetic recording type, and said recording means includes a magnetic recording head for each of said photo-responsive means, connected thereto arranged in serial form across said moving tape for recording in columnar form related information sensed in said record.

4. Apparatus as claimed in claim 3, further including a row of magnetic reading heads positioned across said tape for subsequently reading each of said recorded columns, said row of reading heads being staggered in the direction of movement of said tape, and means connecting said reading heads to a single output whereby a related serial by bit data signal is generated.

5. Apparatus as claimed in claim 4 for use with a typewriter including a keyboard and a moving carriage, said apparatus further including means responsive to carriage escapement for longitudinally moving said magnetic tape a distance corresponding to one punched record column space, and means responsive to carriage return movement for moving said magnetic tape to a position in which all of said magnetic recorded information recorded during carriage escapement is read by said magnetic reading heads.

6. Apparatus as claimed in claim 5 wherein means are provided for magnetically recording on said moving tape information printed by siad typewriter as a result of manual actuation of said typewriter keyboard.

7. Apparatus as claimed in claim 6 wherein said tape is of the magnetic recording type and said apparatus further includes a row of magnetic recording heads operatively connected to individual segregated photo-responsive means, means for positioning said row of magnetic recording heads adjacent said magnetic tape transverse to the direction of motion thereto for recording in columnar form related information sensed in said card.

8. Apparatus for translating data from a multi-column punched record to high speed data output comprising; a multi-column photoelectric sensing station having means for sensing each record column if activated comprising a light source for simultaneously passing light through a plurality of perforated columns within said record, a matrix of longitudinal rows of light pipes for segregating light passing through the punched record, a series of photocells associated with columns of light pipes for receiving light from said pipes, a magnetic tape having a row of transverse opening of a number equal to the number of possible apertures within a given column of said record for shuttering light in turn from each column of said record to said series of photocells, means for moving said magnetic tape to effect a serial optical scanning of said record columns, means responsive to operation of said photocells for recording said sensed data magnetically on said tape in columnar form as each related record column is sensed, and means for serially reading each of said magnetically recorded columns on said tape to generate a related serial by bit data signal.

9. Apparatus as claimed in claim 8 further including a row of magnetic read heads of like number to said recording heads positioned across and adjacent to said tape at a position spaced from said row of magnetic recording heads for subsequently reading each of said magnetically recorded columns, one of said rows of magnetic heads being staggered in the direction of movement of said tape and the other row being transversely aligned and means connecting said reading heads to a single output line whereby a related serial by bit data signal is generated.

10. Apparatus for high speed reading of data from a stationary, multi-column punched record comprising means for simultaneously passing light through a plurality of perforated columns within said record to provide segregated light rays for each of said perforations, a tape member having a single row of transverse apertures of a number equal to the possible number of perforations within a record column, means for supporting said perforated tape in light receiving position to said rays, a plurality of photosensitive devices positioned on the side of said tape opposite that of said light source with each photosensitive device positioned adjacent an associated aperture within said tape and means for moving said tape longitudinally of said record for shuttering light sequentially from each column of said record to said series of photosensitive means to effect sequential photoelectric scanning of said stationary multi-column perforated record.

11. Apparatus for sensing data from a stationary multi-column perforated record comprising; means for simultaneously passing light through a plurality of said perforated record columns, means for segregating said light rays passing through each perforation, a moving tape positioned in the path of said segregated rays including a single transverse row of spaced apertures to sequentially allow passage of segregated rays of any one of said record columns, and a row of segregated photo-responsive means positioned on the side of said tape opposite said record, each of said photo-responsive means being aligned with associated tape openings to receive said segregated rays.

12. A data translator comprising; means for supporting a punched record in a stationary position, multi-column photoelectric sensing means for sensing code perforations in said record, a moving light shutter for activating the photoelectric sensing means column by column, a second record carried by said light shutter and movable therewith, recording means responsive to said sensing means for recording information on said second record, and serial read out means for reading said second record serial by bit at high speed.

13. Typewriter control optical sensing apparatus for sensing a stationary, multi-column punched record comprising; a typewriter including a moving carriage, means for simultaneously passing light through a plurality of said punched record columns, means for segregating the light rays passing through each record perforation, a moving tape positioned in the path of said rays, said tape including a single row of spaced apertures to sequentially allow passage of segregated rays of any one of said record columns, a fixed row of photo-responsive means positioned on the side of said tape opposite said record and aligned with said tape apertures to receive said segregated rays passing therethrough, and means responsive to typewriter carriage movement for longitudinally moving said tape whereby said punched records are optically sensed during typewriter operation.

14. Apparatus as claimed in claim 13, further including means associated with said photo-responsive means and responsive to ray interception for recording said columnar record information in another form.

15. Apparatus as claimed in claim 14, wherein said tape is of the magnetic recording type, and said recording means includes a magnetic recording head for each of said photo-responsive means arranged in serial form across moving tape for recording in columnar form related information sensed in said record.

16. Apparatus as claimed in claim 15 wherein further including means associated with said photo-responsive means and responsive to ray interception for operation of said typewriter irrespective of keyboard operation.

References Cited by the Examiner

UNITED STATES PATENTS

| | | | |
|---|---|---|---|
| 2,910,685 | 10/1959 | Shafer | 340—341 |
| 2,910,686 | 10/1959 | Rohland | 340—341 |
| 2,929,556 | 3/1960 | Hawkins | 340—341 |
| 2,938,666 | 5/1960 | Rand | 235—61.115 |
| 2,967,664 | 1/1961 | Ress | 235—61.115 |

ROBERT C. BAILEY, *Primary Examiner.*

DARYL W. COOK, MALCOLM A. MORRISON, *Examiners.*